United States Patent [19]

Simonis et al.

[11] 4,372,104
[45] Feb. 8, 1983

[54] PICK-UP BALER FOR AGRICULTURAL MATERIAL

[75] Inventors: Jürgen Simonis, Wolfenbüttel; Helmut Czok, Schladen, both of Fed. Rep. of Germany

[73] Assignee: Gebrüder Welger GmbH & Co. Kommanditgesellschaft, Wolfenbüttel, Fed. Rep. of Germany

[21] Appl. No.: 274,313

[22] Filed: Jun. 16, 1981

[30] Foreign Application Priority Data

Jun. 18, 1980 [DE] Fed. Rep. of Germany ....... 3022631

[51] Int. Cl.³ .......................................... A01D 39/00
[52] U.S. Cl. .................................. 56/341; 100/142; 100/189
[58] Field of Search ................ 56/341, 342, 343, 344; 100/142, 189

[56] References Cited

U.S. PATENT DOCUMENTS

| 2,498,319 | 2/1950 | Vutz et al. | 100/19 R |
| 3,515,058 | 6/1970 | Ginghoven et al. | 100/189 |
| 3,938,652 | 2/1976 | Sacht et al. | 56/341 |
| 4,022,002 | 5/1977 | Sweeney | 56/341 |
| 4,157,643 | 6/1979 | White | 56/341 |
| 4,184,312 | 1/1980 | Dosterling et al. | 56/341 |

Primary Examiner—Robert A. Hafer
Attorney, Agent, or Firm—Toren, McGeady and Stanger

[57] ABSTRACT

In an agricultural pick-up baler a pick-up device loads harvested agricultural material into a supply passage connected to the inlet opening into a compressing channel, said inlet opening being located in the bottom of said compressing channel. A pressing ram is reciprocated back and forth in the compressing channel by at least one connecting rod and compacts the material introduced into the compressing channel. A conveying device fixed to the connecting rods extends into the supply passage and moves the agricultural material from the pick-up device through the supply passage toward the inlet of the compressing channel. A packing device located in the supply passage moves the agricultural material received from the conveying device through the inlet into the compressing channel. The path of travel of the conveying device within the supply passage passes through the path of travel of the packing device.

10 Claims, 5 Drawing Figures

PICK-UP BALER FOR AGRICULTURAL MATERIAL

SUMMARY OF THE INVENTION

The present invention is directed to an agricultural pick-up baler and, more particularly, to a baler having a compressing channel containing a pressing ram and having in its bottom an inlet opening through which the agricultural material taken up by a pick-up device is conveyed through a supply passage by a conveying device and a packing device into the compressing channel inlet.

In a known pick-up baler of this type, disclosed in U.S. Pat. No. 4,157,643 two feeding mechanisms acting one after the other feed the material to be compressed from the pick-up device to the inlet opening and stuff the material into the compressing or compacting channel. Each conveying device has its own drive mechanism and conveying prongs, and the path of movement of the prongs is obtained by complicated control mechanisms. For control, such balers sometimes use crank-rocker linkage drives and other times employ slide-crank mechanisms. In other balers, drums with eccentrically supported prongs are utilized, note U.S. Pat. No. 2,498,319. Such arrangements are complicated, require considerable maintenance and are subject to wear. Moreover, it is disadvantageous that the conveying device continues to move the material even during the power stroke of the packing device thereby interfering with the insertion of the packing prongs.

The present invention is directed to overcoming the disadvantages present in the prior art. The primary object of the present invention is to improve the interaction between the conveying device and the packing device and to simplify the structure of the conveying device while increasing the capacity of the two devices conveying the agricultural material into the compressing channel.

In accordance with the present invention, the conveying prongs of the conveying device are attached to the connecting rods driving the pressing ram so that the path of movement of the prongs moves through the path of movement of the packing device within the supply passage. As a result, a very simple conveying device is provided which is not subject to failure and requires neither maintenance, nor additional bearing and lubrication points. Further, no additional drive means is needed. In addition, the conveying device provides conveying motion only during the power stroke of the plunger when the packing device has been withdrawn so that there is no interference between the conveying device and the packing device.

In accordance with the present invention, the prongs of the conveying device work synchronously with the packing device so that after the prongs are withdrawn from the supply passage, the packing device moves into the supply passage and commences the movement of that portion of the agricultural material moved along the passage by the conveying device. The packing device separates the conveyed portion from the swath so that any jamming of the product between the pressing ram and the inlet opening into the compressing channel is prevented and a homogeneous filling of the channel with the agricultural material is attained.

In a preferred embodiment, the packing device is made up of known rotating segmental elements with a toothed conveying edges. The conveying edge when in overlapping relation with the face of the pressing ram is always at an angle of at least 90° with that face. The packing device may also consist of rearwardly curved flat springs. Such arrangements result in especially simple and economical embodiments with only a few driving elements and no control elements.

Another feature of the invention is the continuous reduction in the height of the supply passage as it approaches the inlet opening into the compressing channel so that the agricultural material is precompressed as it moves toward the compressing channel.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
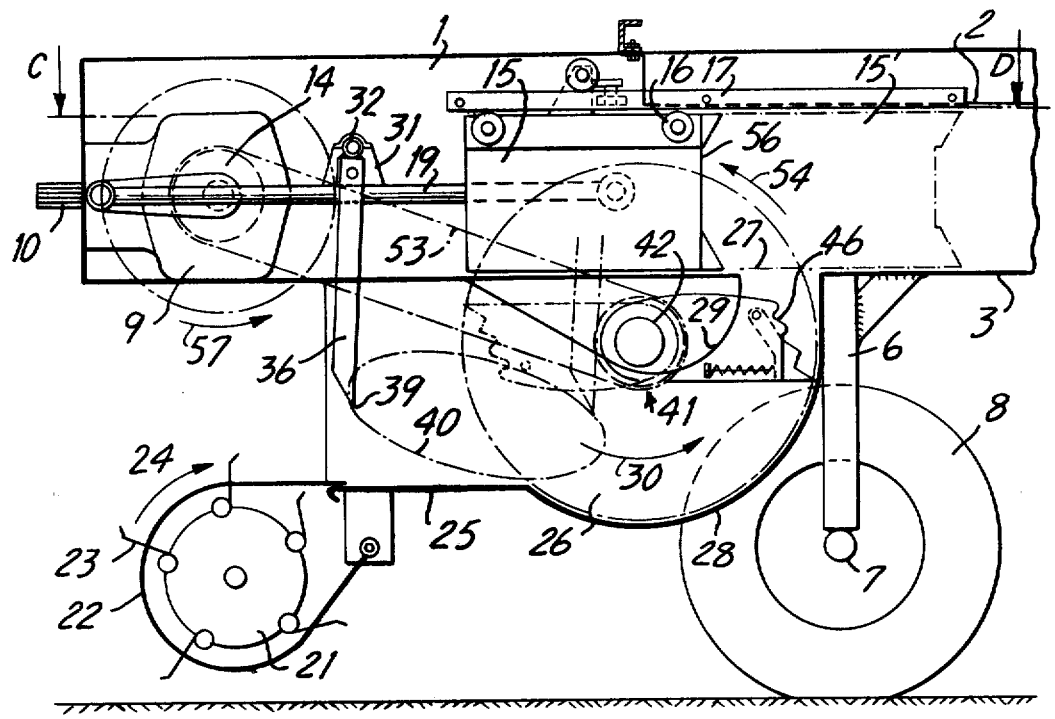
FIG. 1 is a side view of the front portion of a pick-up baler embodying the present invention with the side wall of the baler removed, note line A—B in FIG. 2, and with the pressing ram in the front end position.

In the drawing a pick-up baler for picking up harvested agricultural material from a field is shown with the left end as viewed in FIG. 1 being its front end and the right end of the baler, not shown, is its rear end. The upper portion of the baler forms a compressing or compacting channel 1 having a rectangular cross-section and defined in the front end-rear end direction by a top plate 2, a bottom plate 3 and two side wall plates 4, 5. The channel 1 is supported on a structure 6 including a wheel axle 7 and wheels 8.

A main transmission gear 9 is located at the front end of the compressing channel 1. A forwardly directed shaft 10 extends from the main transmission gear 9 out of the channel 1 for connection to a tractor power take-off shaft. In addition, a transverse shaft 11 extends out of the opposite sides of the main transmission gear. An operating crank 12 is secured to each of the opposite ends of the transverse shaft 11. As viewed in FIG. 2, a lagging crankshaft is attached to the upper operating crank 12 and it is supported in the side wall 5 and mounts a chain wheel 14 on the end of the crankshaft projecting outwardly from the side wall.

Figure 2:
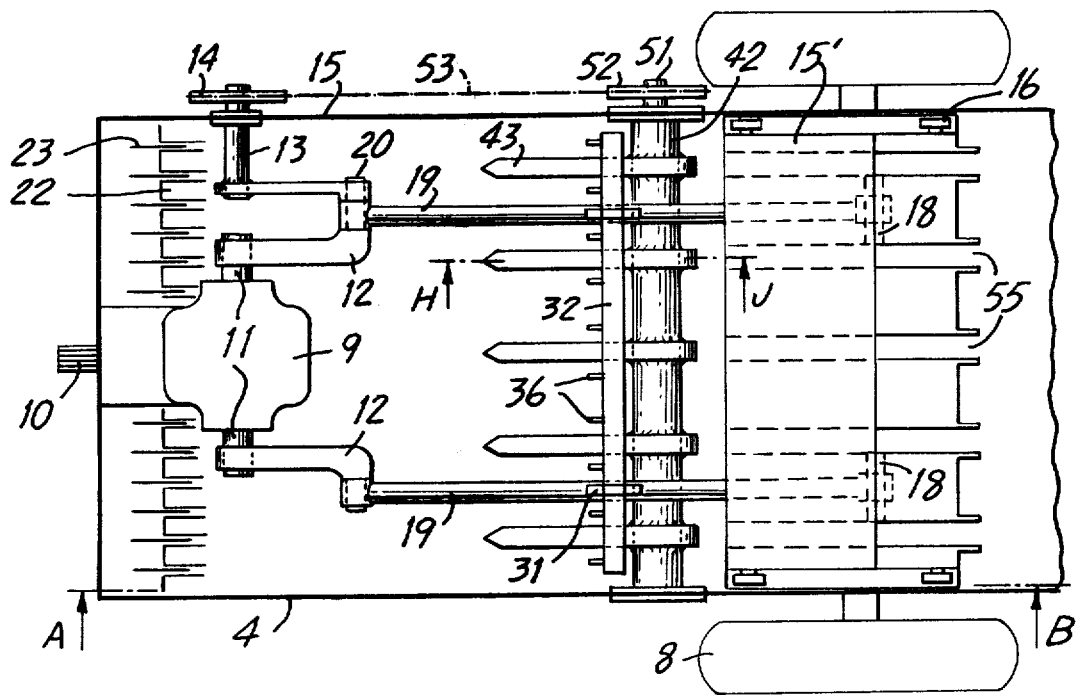
FIG. 2 is a top view of the baler taken along the line C—D in FIG. 1, however, with the pressing ram moved into its rear end position.

Rearwardly within the compressing channel 1 from the gear 9 is a pressing ram 15 supported by rollers 16 mounted on guide rails 17 which are secured to the opposite side walls 4, 5. As can be seen in FIG. 2, two axially aligned and spaced bolts 18 within the ram 15 each support one of a pair of parallel connecting rods 19 extending in the front end-rear direction. The front ends of the connecting rods are each connected to a journal 20 on a different one of the operating cranks 12. When the transverse shaft 11 is driven the journals 20 on the operating crank 12 travel in a circle, note the dash-dot circle in FIG. 1, and move in the direction of the arrow 57 so that the pressing ram 15 undergoes a reciprocating motion between its front end position shown in solid lines and its rear end position 15' shown in dash-dot lines in FIG. 1.

Below the main transmission gear 9 at the front end of the baler, a pick-up device 21 is positioned and is made up of a number of segmental sheets 22 to form a drum. A number of spring prongs 23 extend outwardly from between the segmental plates. As the prongs 23 rotate in the direction indicated by arrow 24, they lift the agricultural material present in a harvested swath on the surface over which the baler is moved and load the material onto a conveying plate 25. Plate 25 forms the front end of a supply passage 26 located below the compressing channel 1. Initially, the agricultural material travels horizontally over the plate 25 from the pick-up device 21 and then moves over a curved conveying bottom plate 28 to an inlet opening 27 in the bottom plate 3. Laterally the supply passage 26 is defined by the two side walls 4, 5 of the compressing channel which extends downwardly below the bottom plate 3. Opposite the bottom plate 28, the supply passage 26 is defined by an upper boundary wall 29. The bottom plate 28 and the upper boundary wall 29 extend in the direction of movement of the agricultural material through the supply passage 26 as indicated by arrow 30 and the spacing between these two surfaces decreases, that is, they are closer together, as the supply passage approaches the inlet opening 27. The convergence of these two surfaces provides a precompressing effect on the agricultural material being conveyed toward the compressing channel 1.

Figure 3:
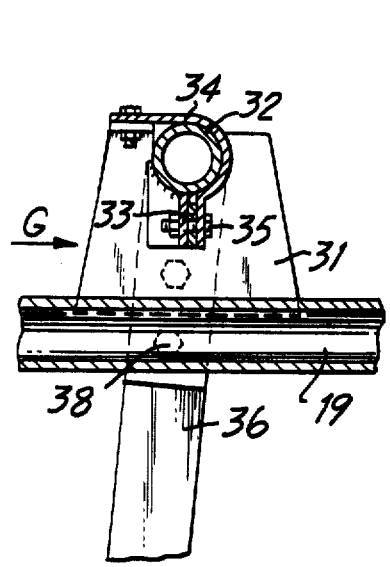
FIG. 3 is an enlarged sectional view taken along the line E—F in FIG. 4 and illustrating the attachment of the conveying device prongs to a connecting rod.
Figure 4:
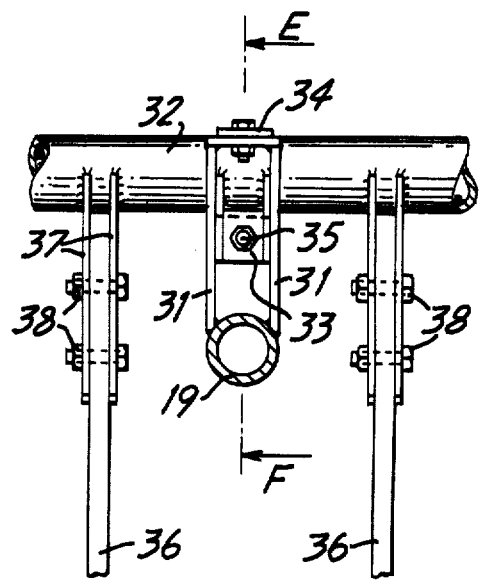
FIG. 4 is a view, partly in section, taken in the direction of the arrow G in FIG. 3.

As shown in FIG. 1 and as illustrated in more detail in FIGS. 3 and 4, two brackets 31 are welded in spaced apart relation on each connecting rod 19 and extend upwardly and support a tubular crossbeam 32 extending across approximately the entire width of the compressing channel 1. Crossbeam 32 is secured to the connecting rods 19 so that it cannot rotate, however, it is held against overload by an overload protection arrangement. As can be seen in FIG. 3, a plate 33 is welded to and extends downwardly from the crossbeam 32. A clamping ring 34 is bolted to the upper ends of the brackets 31 and extends around and in contact with the crossbeam 32. Below the crossbeam 32, clamping ring 34 is attached to the plate 33 by a break-off bolt 35. When the crossbeam 32 is under excessive torsional stress, the break-off bolt 35 ruptures and permits the crossbeam 32 to rotate under such stress.

A plurality of conveying prongs 36 are removably secured to the crossbeam 32 and are uniformly spaced apart across the width of the compressing channel 1. As can be seen in FIG. 4, each conveying prong 36 is supported from the crossbeam 32 by two suspension clips 37 welded to and extending downwardly from the crossbeam. The conveying prongs 36 are fitted between the suspension clips 37 and are held in place by a pair of bolts 38.

As the connecting rods 19 are driven by the operating cranks 12 from the transverse shaft 11, the conveying prongs 36 extend downwardly through the bottom plate 3 of the compressing channel 1 into the supply passage 26 where the pointed tips 39 of the prongs travel along an approximately elliptical path 40 during each complete reciprocating cycle of the pressing ram 15. The path 40 of the pointed tips 39 is shown in dot-dash line in FIG. 1.

Figure 5:
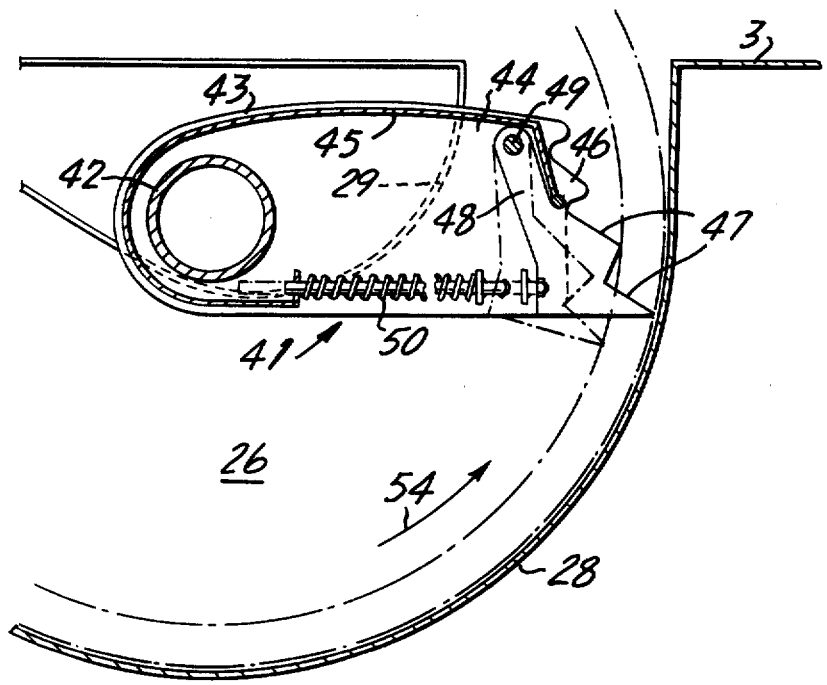
FIG. 5 is an enlarged sectional view taken along the line H—J in FIG. 2 and illustrating the packing device.

A packing device 41 is pivoted in the space between the bottom plate 3 of the compressing channel 1 and the upper boundary wall 29 of the supply passage 26. The packing device is shown in greater detail in FIG. 5 and consists of a tube 42 extending transversely of the front end-rear end direction of the baler with five segmental elements 43 attached to the tube. Each segmental element 43 includes two segmental plates 44 spaced apart and connected to one another by a narrow filler plate 45. Along one edge each segmental plate 44 has a conveying edge 46 with four teeth arranged in a saw-toothed shape. Two teeth 47 are formed in one part as a plate 48 positioned between the two segmental plates 44 of a segmental element 43 and the plate 48 can be pivoted inwardly between the segmental plate 44 about a bolt 49. Plate 48 is pressed into the conveying position by a compression spring 50 located between the segmental plates 44.

The opposite ends of tube 42 are supported in side walls 4, 5 and a short shaft 51 extends outwardly through wall 5 from the tube 42. A chain wheel 52 is secured to the shaft 51 and a chain 53 runs over the chain wheel 52 and the chain wheel 14 mounted on the lagging crankshaft 13. As the pressing ram 15 is reciprocated back and forth via the connecting rods 19 the packing device 41 is also rotated in the direction of arrow 54 around a circular path shown in dot-dash lines in FIG. 1. As can be seen in FIG. 1, the path of the packing device and the path of the conveying prongs overlap. As the segmental elements moves from the supply passage 26 into the compressing channel 1 they pass through slots 55 formed in the pressing ram 15. The conveying edges 46 of the segmental elements 43 are arranged so that, when entering into the pressing ram 15, they define an angle of at least 90° with the end face 56 of the ram whereby a definite stripping of the agricultural material to be baled is assured. Boundary wall 29 also is slotted to afford the passage of the segmental elements 43. Furthermore, boundary wall 29 and bottom plate 3 of the compressing channel 1 have slots for the movement of the conveying prongs 36.

Operation of the pick-up baler is illustrated best in FIG. 1. Pick-up device 21 lifts swaths of the agricultural material and deposits the material onto the conveying plate 25. As the transverse shaft 11 rotates it reciprocates the compressing ram 15 back and forth and at the same time by way of the connecting rod 19 drives the conveying prongs 36 along an approximately elliptical path of travel 40. As the prongs move into the supply passage they move downwardly and carry the agricultural material, a portion at a time, along through the constricting supply passage 26 toward the packing device 41. As can be seen in FIG. 1 with the ram 15 shown in full line about to commence its rearward or pressing stroke, the prongs 36 are ready to move rearwardly toward the path of travel of the packing device. At the same time the packing device, shown in full line, is ready to move around the upper half of its path of travel ahead of the conveying prongs. Note in FIG. 1 that when the ram is in its rear position 15', the packing device 41 has traveled 180° from the position shown in full line to that illustrated in dot-dash line and is ready to move downwardly into the supply passage to take the agricultural material from the conveying device and move it through the inlet opening 27 into the compressing channel 1 in front of the rearwardly moving pressing ram 15. It can be appreciated that the various parts of the pick-up baler cooperate with one another in moving the agricultural material through the baler so that there is no interference or obstruction.

While specific embodiments of the invention have been shown and described in detail to illustrate the application of the inventive principles, it will be understood that the invention may be embodied otherwise without departing from such principles.

We claim:

1. Agricultural pick-up baler comprising wall means forming a compressing channel having a front end and a rear end with an inlet opening located in the bottom of said compressing channel intermediate the ends thereof, a pressing ram located within said compressing channel, means for reciprocating said pressing ram in the front end-rear end direction, said reciprocating means including at least one connecting rod extending in the front end-rear end direction and attached to said pressing ram for imparting reciprocating movement to said pressing ram, a pick-up device located below said compressing channel for picking up harvested agricultural material, a supply passage located below said compressing channel and extending between said pick-up device and said inlet opening into said compressing channel for receiving agricultural material from said pick-up device and for delivering the agricultural material into said compressing channel, a conveying device movable through said supply passage for moving the agricultural material from said pick-up device into said supply passage toward the inlet opening in said compressing channel, a packing device movable along the path through said supply passage downstream from said conveying device for forcing the agricultural material from said supply passage through the inlet opening into said compressing channel wherein the improvement comprises that said conveying device includes a plurality of prongs attached to said connecting rod and extending downwardly from said compressing channel into said supply passage with said connecting rod imparting an elliptical path of travel within said supply channel to the ends of said prongs spaced from said connecting rod and located within said supply channel, and the path of travel of the ends of the prongs within said supply channel extends into the path of travel of said packing device within said supply passage.

2. Agricultural pick-up baler, as set forth in claim 1, wherein a pair of parallel said connecting rods drive said pressing ram and said connecting rods are disposed in spaced apart relation, a crossbar extends transversely of said connecting rods and is connected to said connecting rods, and a plurality of said conveying prongs are attached to and extend downwardly from said crossbar.

3. Agricultural pick-up baler, as set forth in claim 2, wherein break-off means provide a connection between said conveying prongs and said connecting rods for providing an overload protection.

4. Agricultural pick-up baler, as set forth in claim 3, wherein said conveying prongs are rigidly attached to said crossbar, and said break-off means secures said crossbar in a non-rotatable manner to said connecting rods and includes a break-off bolt which ruptures when an overload acts on said crossbar through said conveying prongs and affords the separation of said crossbar from rigid connection to said connecting rods.

5. Agricultural pick-up baler, as set forth in claim 1, including drive means for reciprocating said pressing ram and for driving said conveying prongs, said drive means including means for driving said packing device, so that said conveying prongs and said packing device move synchronously with said packing device engaging the material in said supply passage after said conveying prongs have moved the material toward the inlet opening of the compressing channel and have been withdrawn from the material.

6. Agricultural pick-up baler, as set forth in claim 5, wherein said packing device comprises a number of laterally spaced continuously rotating members, and a common rotating axle supporting said members.

7. Agricultural pick-up baler, as set forth in claim 6, wherein said pressing ram has a pressing face directed toward the rear end of said compressing channel, said members of said packing device each comprise a segmental element having a toothed conveying edge, and said conveying edge moves in overlapping relation with the pressing face of said pressing ram and in such overlapping relation the conveying edge forms an angle of at least 90° with said pressing face.

8. Agricultural pick-up baler, as set forth in claim 7, wherein said segmental elements have elastically yielding teeth at said conveying edge.

9. Agricultural pick-up baler, as set forth in claim 6, wherein said members are formed of flat springs having a curved shape and located in closely spaced relation to the bottom surface of said supply passage.

10. Agricultural pick-up baler, as set forth in claim 1, wherein said supply passage comprises a bottom plate, an upper boundary wall spaced upwardly from said bottom plate, the dimension of said supply passage between said bottom plate and upper boundary wall decreases continuously in the direction from said pick-up device to the inlet opening into said compressing channel.

* * * * *